United States Patent [19]

Narcisi et al.

[11] Patent Number: 5,010,806
[45] Date of Patent: Apr. 30, 1991

[54] MACHINE TO FAST COOK PASTA AND SIMILAR FOODS

[76] Inventors: Henry R. Narcisi, 238 Larch Rd., Frankfort, Ill. 60423; Ernest S. Kettelson, 16801 Ridge Rd., Minooka, Ill. 60447

[21] Appl. No.: 564,902

[22] Filed: Aug. 9, 1990

[51] Int. Cl.$^5$ .............................................. A47J 37/12
[52] U.S. Cl. ........................................ 99/357; 99/330; 99/352; 99/403; 99/407
[58] Field of Search ................. 99/330, 331, 336, 338, 99/352, 353, 355, 357, 403, 404, 407–410, 417, 332, 334; 210/DIG. 8

[56] References Cited

U.S. PATENT DOCUMENTS

| | | | |
|---|---|---|---|
| 3,790,391 | 2/1974 | Bolleter et al. | 99/330 |
| 3,928,045 | 12/1975 | Tsunoda et al. | 99/357 |
| 4,175,482 | 11/1979 | Kumagaya | 99/330 |
| 4,214,514 | 7/1980 | Contino et al. | 99/408 |
| 4,718,331 | 1/1988 | Ansaloni et al. | 99/407 |
| 4,732,080 | 3/1988 | Vita | 99/407 |
| 4,803,916 | 2/1989 | Tacconi | 99/352 |
| 4,803,917 | 2/1989 | Barbieri | 99/407 |
| 4,821,633 | 4/1989 | Ripatonda | 99/357 |
| 4,869,160 | 9/1989 | Pratolongo | 99/331 |
| 4,901,632 | 2/1990 | Lori | 99/403 |

Primary Examiner—Timothy F. Simone
Attorney, Agent, or Firm—Ernest Kettelson

[57] ABSTRACT

A machine to fast cook an individual serving of pasta and similar foods in the short time span of a minute or less, comprises a single cooking chamber in which to complete both of a two phase cooking cycle. The first phase exposes the pasta in the cooking chamber to very high temperature water, 300 to 400 degrees Fahrenheit, under very high pressure, sufficiently high to substantially prevent vaporization thereof, for a period of about thirty seconds. Such pressurized high temperature water is provided by a boiler connected by a conduit to the cooking chamber, and after the first phase of the cooking cycle it is discharged from the cooking chamber into an expansion tank. The second phase of the cooking cycle exposes the pasta in the cooking chamber to hot water below the boiling point but at a cooking temperature of about 190 degrees Fahrenheit for about twenty seconds. Such hot water is provided by a separate hot water tank which is connected by a separate conduit to the cooking chamber, and after the second phase of the cooking cycle it is drained from the cooking chamber. The cooking chamber is then opened to deposit the individual serving of cooked pasta on to a serving plate.

22 Claims, 6 Drawing Sheets

MACHINE TO FAST COOK PASTA AND SIMILAR FOODS

BACKGROUND OF THE INVENTION

This invention relates to the field of fast cooking pasta and other similar types of foods, particularly in small quantities such as individual servings which may be dispensed from vending machines or served in fast food restaurants, company cafeterias, offices and in the home on those occasions when quickly prepared individual servings of food are desired by one or more family members or guests.

Most of the prior art devices in this field have not been able to cook pasta and similar foods in the very rapid time span of a minute or less, which is a desirable objective for use in vending machines and fast food restaurants. Some prior art machines which do claim to be able to cook pasta within about a minute or less require the use of two or more cooking chambers and a complex as well as expensive system of conduits and food transfer valves. The prior art machines do not have controls and equipment to precisely monitor and maintain both pressure and temperature in the cooking chambers at the same constant levels throughout each phase of the entire cooking cycle. That is a desirable objective to insure completely thorough cooking of the food and to do so continuously for batch after batch regardless of changes in ambient temperature and regardless of changes in the equipment itself due to absorption of heat resulting in expansion or contraction, changes in temperature of water pumped into the system and the like. The present invention overcomes such problems, needing only a single cooking chamber in which to perform all of the phases of the cooking cycle and providing controls and equipment to maintain the same constant temperature and pressure as pre-selected throughout the entire time span of each separate phase of the cooking cycle.

Examples of prior art machines for cooking foods such as pasta include those disclosed in the following United States patents:

U.S. Pat. No. 4,901,632 discloses a machine which performs a three phase cooking process and utilizes a plurality of cooking chambers.

U.S. Pat. No. 4,869,160 discloses a machine for fast cooking of pasta and the like which also utilizes a plurality of cooking chambers, in this case two, and a food transfer system comprising a conduit and valve through which the pasta must be moved in order to complete the second phase of the cooking cycle.

U.S. Pat. No. 4,803,916 discloses a machine for rapidly cooking batches of spaghetti, which also utilizes two cooking chambers and requires a food transfer system comprising a valve and conduit through which the food has to be moved from the first cooking chamber to the second.

U.S. Pat. No. 4,821,632 discloses an apparatus for automatically cooking pasta comprising a basket to hold the pasta inside a housing which receives heated water, two heat exchangers and a recirculating system to conserve and re-utilize heat from previously used water to cook a previous batch of pasta.

U.S. Pat. No. 4,803,917 discloses an apparatus to automatically cook pasta and deposit it on a serving plate, comprising a basket to hold the serving of pasta to be cooked, a cooking vessel to receive boiling water which can be moved upwardly to receive the basket of pasta therein for cooking, and apparatus to thereafter move the basket of cooked pasta into position over the serving plate whereupon it opens to deposit the pasta on the plate.

U.S. Pat. No. 4,741,261 discloses a cooking apparatus for simultaneously cooking several separate quantities of pasta, including a plurality of perforated baskets to hold each quantity of pasta, and a chamber of steam and hot water in which the baskets of pasta are suspended for cooking.

U.S. Pat. No. 4,214,514 discloses a cooking device for cooking individual servings of food, comprising a plurality of perforated pots to hold individual servings of pasta or the like, into which boiling water is pumped from a reservoir to cook the pasta, after which the pots are lifted to let the water drain through the perforations and the individual servings can then be removed for eating.

U.S. Pat. No. 4,175,482 discloses an automatic high-pressure flash cooker to cook beans or grains under high pressure steam, comprising a steaming chamber in which the food product is exposed to steam, and conduits to introduce the steam therein as well as to later drain the water and steam therefrom, after which the flash-cooked beans or grains are removed.

U.S. Pat. No. 3,928,045 discloses an automatic cooking and vending machine for boiled noodles, comprising a refrigeration chamber to hold containers of pre-cooked or boiled noodles, a cooking chamber to heat the noodles and eventually add a broth thereto for flavoring, then dispensing the broth flavored noodles in the containers for eating.

U.S. Pat. No. 3,790,391 discloses an apparatus for steam pressure cooking of food, comprising a steam pressure cooker, an open top container therein to hold the food to be cooked, a steam distributing pipe having apertures for release of steam positioned below the open top containers, and steam from an external source is pumped into and through the steam distributing pipe from which steam exits through the apertures and through the food in the open top container positioned above the steam distributing pipe.

SUMMARY OF THE INVENTION

It is an object of the invention to provide a fast cook pasta machine to cook individual servings of pasta within about a minute or less wherein only a single cooking chamber is needed to perform all phases of the cooking cycle.

It is an object of the invention to provide a fast cook pasta machine to cook individual servings of pasta within about a minute or less wherein the precise water temperature and pressure required can be maintained constant at such levels throughout the entire time span of each separate phase of the cooking cycle.

It is an object of the invention to provide a fast cook pasta machine to cook individual servings of pasta within about a minute or less wherein a plurality of cooking chambers are provided, in each of which all phases of the cooking cycle are completed without transferring the pasta from one cooking chamber to another, and wherein a single pressurized boiler, a single hot water tank, a single expansion tank and a single compressor are connected to supply each of the plurality of cooking chambers.

It is an object of the invention to provide a fast cook pasta machine to cook individual servings of pasta within about a minute or less in which the cooking chamber may be positioned at a remote location far enough from the pressurized boiler and hot water tank whereby heat radiating therefrom has dissipated before it can reach the cooking chamber.

It is an object of the invention to provide a fast cook pasta machine to cook individual servings of pasta within about a minute or less, including a single cooking chamber in which each phase of the cooking cycle can be completed without transferring the pasta therein from one cooking chamber to another and in which pivotable covers open and close both the entrance to and exit from the cooking chamber of the pasta.

DESCRIPTION OF PREFERRED EMBODIMENT

Figure 1:
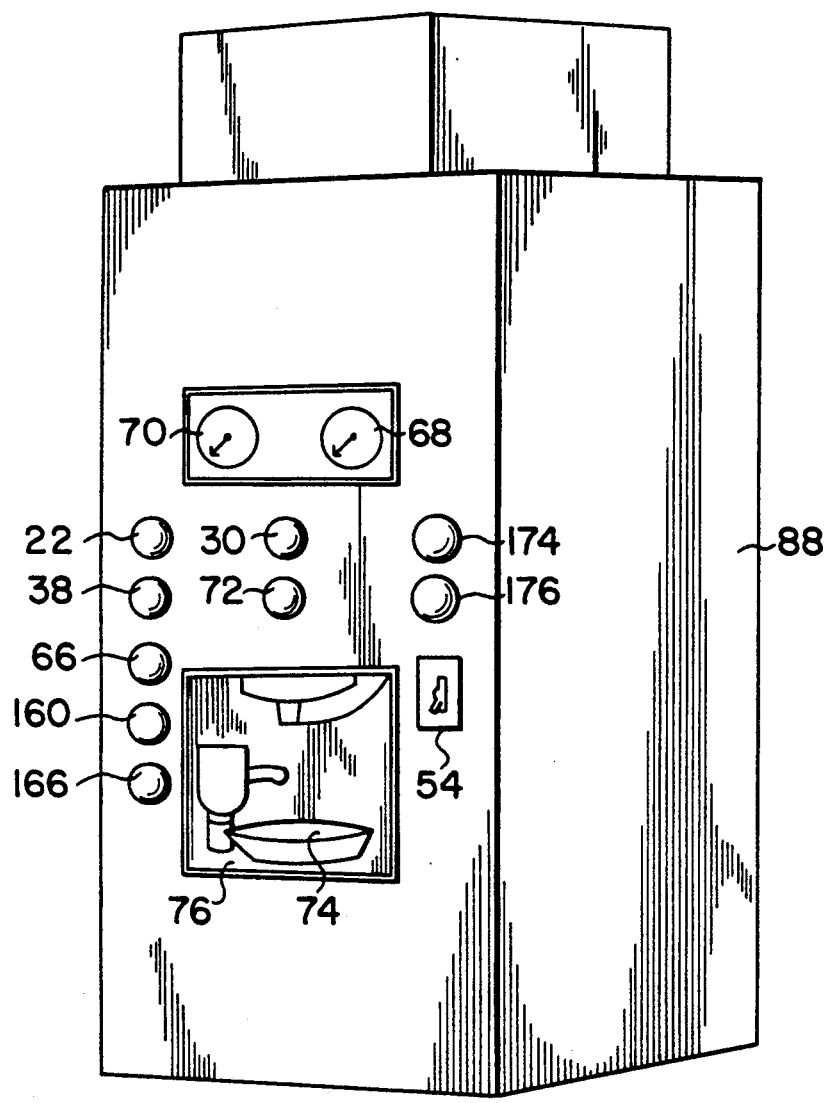
FIG. 1 is a perspective view of the fast cook pasta machine in accordance with this invention enclosed in a compact cabinet.
Figure 2:
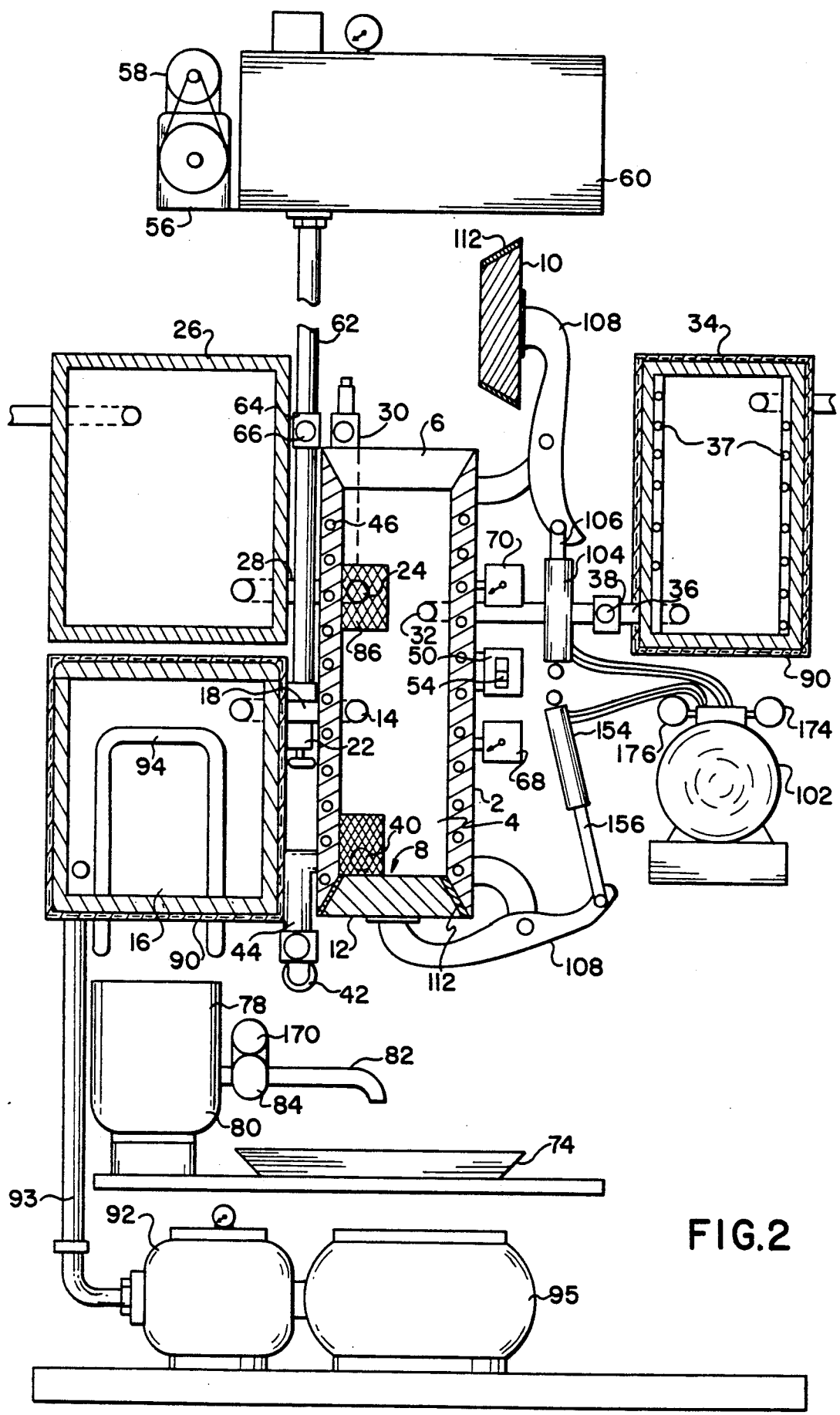
FIG. 2 is an elevation view partially in section of the component parts which make up a fast cook pasta machine in accordance with this invention.
Figure 3:
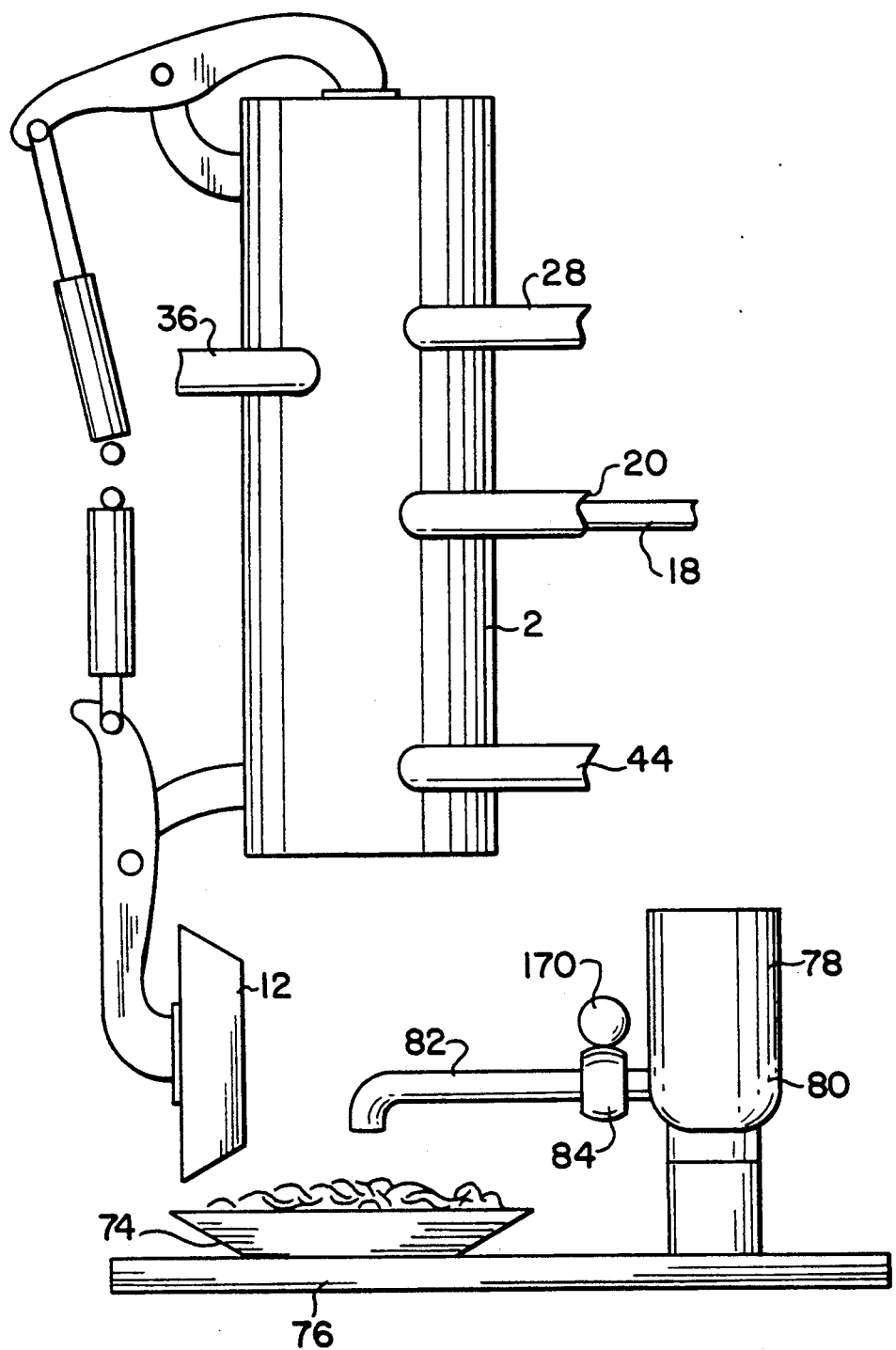
FIG. 3 is an elevation view of the cooking chamber of the fast cook pasta machine shown in FIG. 2 but as seen from the opposite side, showing the outlet door in the open position with a serving of cooked pasta in the serving plate, the connecting conduits which lead to the other component parts shown partially broken away but showing the points at which they enter or exit the cooking chamber.
Figure 4:
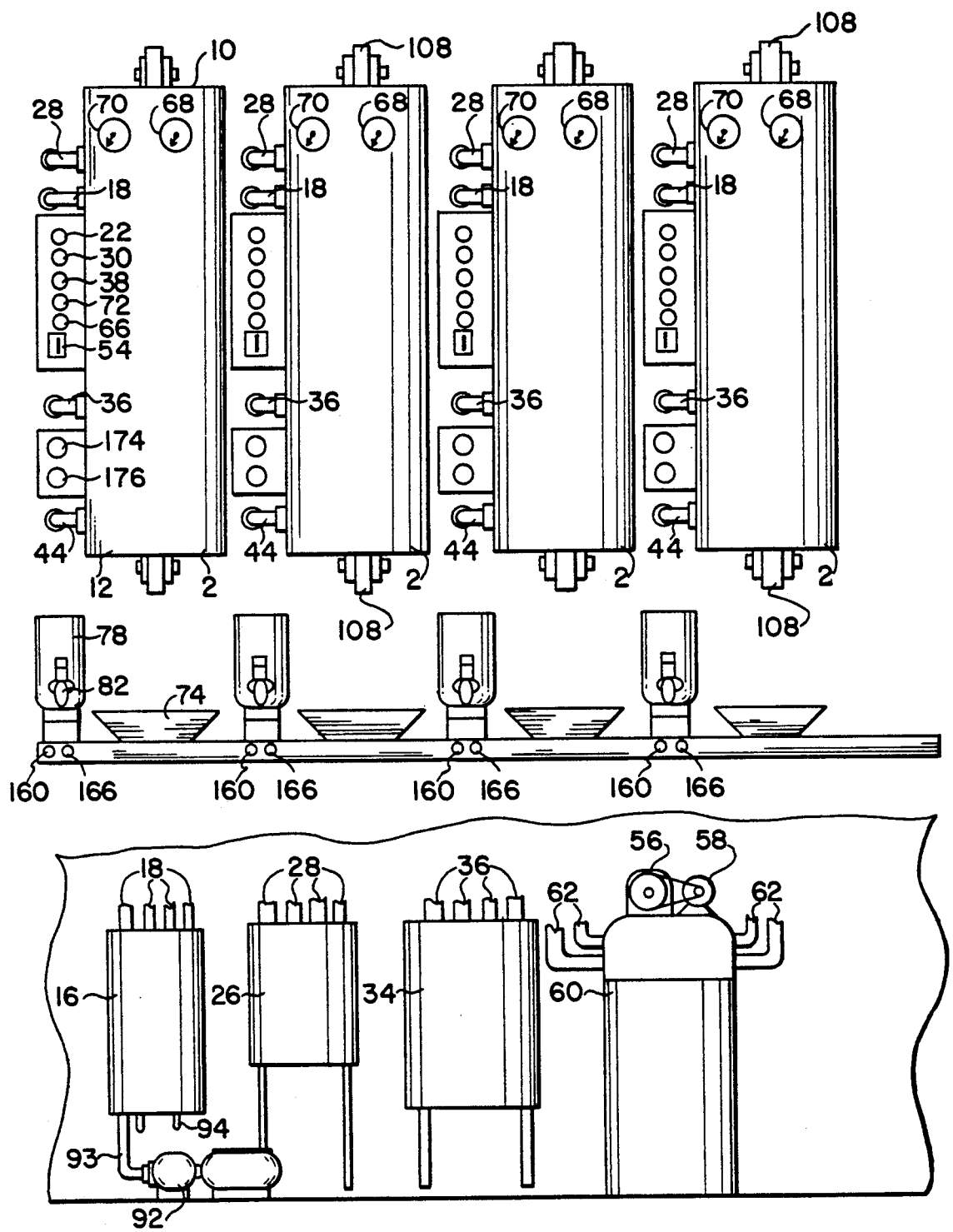
FIG. 4 is an elevation view of an installation in which a plurality of the fast cook cooking chambers are mounted in one room, all of which are connected to a single boiler, a single expansion tank, a single hot water tank, and a single compressor to provide a supplemental pressure source, the latter components shown installed in a separate room, and the connecting conduits which lead to each of the four cooking chambers shown in this figure are partially broken away.
Figure 5:
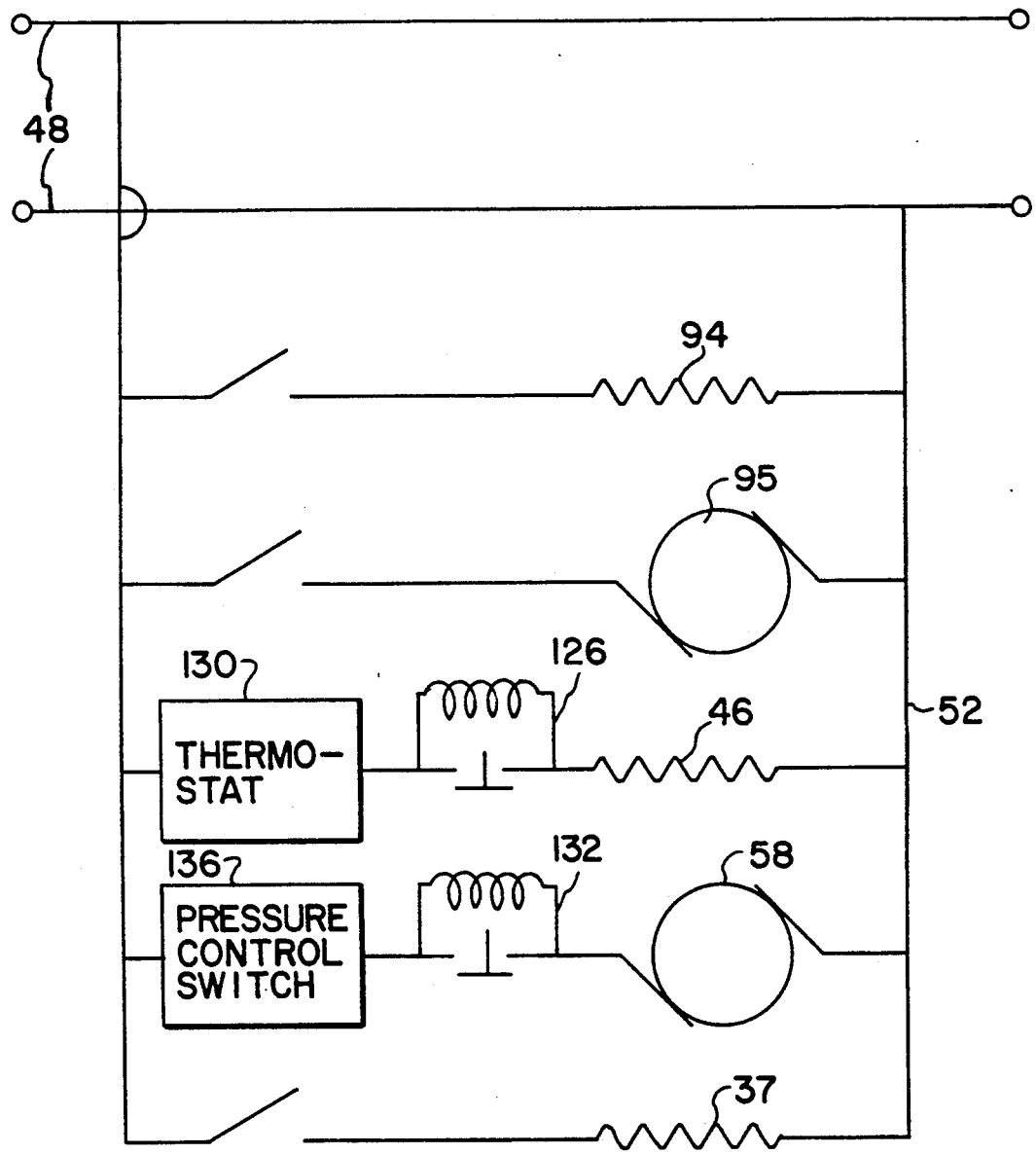
FIG. 5 is a schematic showing the electric utility power source and the power circuit for the primary heating elements and pressurizing assembly as well as for the supplemental heating element and compressor.
Figure 6:
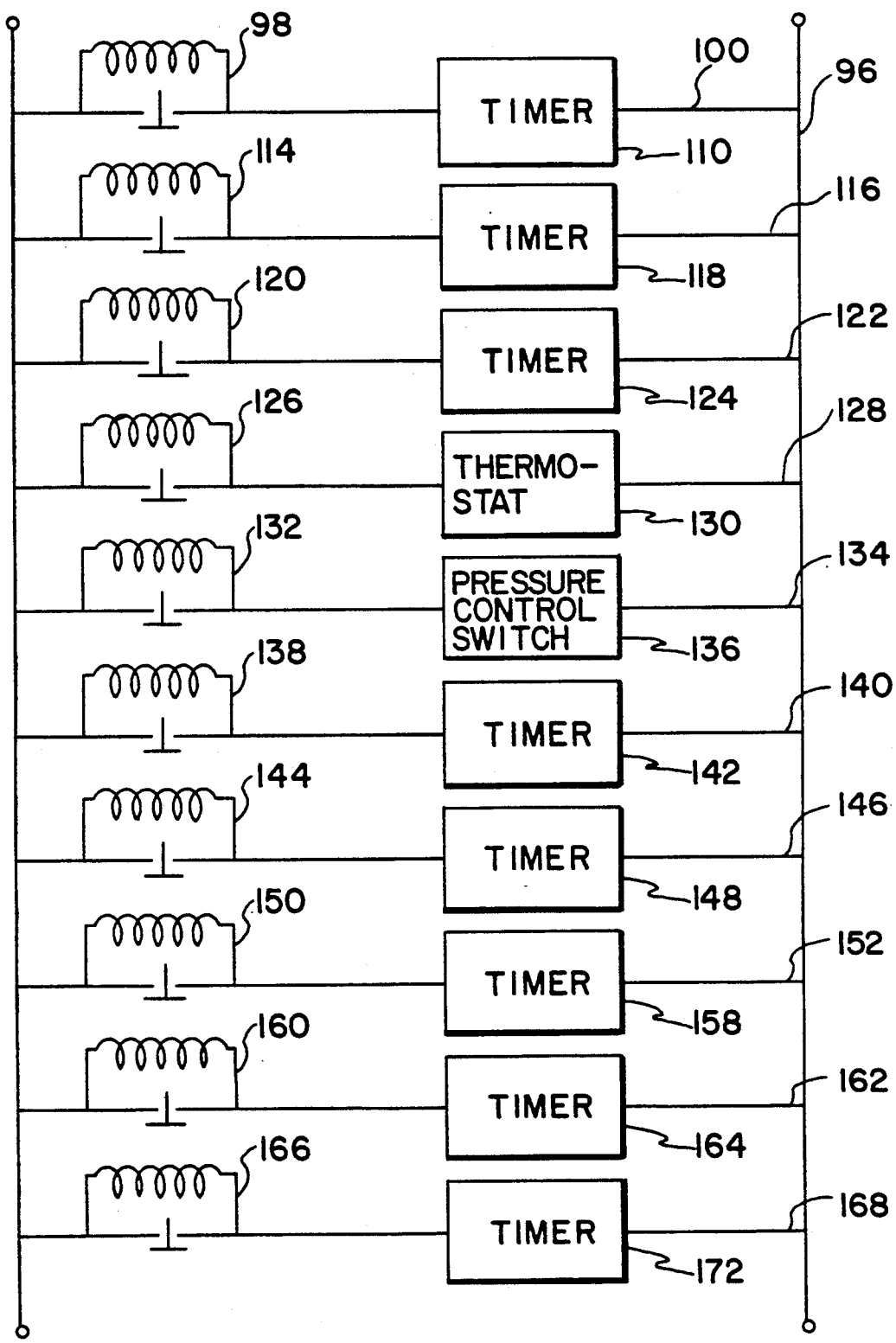
FIG. 6 is a schematic showing the operation control circuit for operation of the fast cook pasta machine in accordance with this invention in the automatic mode.

A fast cook pasta machine in accordance with this invention includes a single cooking chamber 2 having a cavity 4 therein to receive pressurized and heated water, having a pasta receiving opening 6 opening to one end of said cavity 4 and a pasta discharge opening 8 opening to the opposite end of said cavity 4. A first openable pressure sealable inlet cover 10 is provided to sealingly close the pasta receiving opening 6, movable between a cavity closed position and a cavity open position. A second openable pressure sealable outlet cover 12 is provided to sealingly close the pasta discharge opening 8, movable between a cavity closed position and a cavity open position.

A high pressure inlet port 14 opens to said cavity 4, connected to a pressurized boiler 16 of highly pressurized, high temperature water by a conduit 18 having an outer circumferential layer 20 of heat insulating material around the conduit 18 to minimize heat loss during the flow of highly pressurized, high temperature water from the boiler 16 to the cavity 4 of the cooking chamber 2.

A high pressure inlet control valve 22 is connected in the conduit 18, operable between a valve open position to permit highly pressurized, high temperature water to flow through said conduit from said boiler 16 into said cavity 4 of said cooking chamber 2 and a valve closed position to discontinue such flow.

A high pressure outlet port 24 also opens to said cavity 4, connected to an expansion tank 26 by a conduit 28 for discharge of said highly pressurized, high temperature water from said cavity 4 and into said expansion tank 26.

A high pressure outlet control valve 30 is connected in the conduit 28, operable between a valve open position to permit the highly pressurized, high temperature water to flow through said conduit from said cavity 4 into said expansion tank 26 and a valve closed position to discontinue such flow.

A low pressure inlet port 32 is provided which opens to said cavity 4, connected to a hot water tank 34 having heated water below the boiling point at atmospheric pressure by a conduit 36. The water in tank 34 is heated to a sufficiently elevated temperature, such as 190° F., to cook pasta and other similar food products by a heating element 37.

A low pressure inlet control valve 38 is connected in the conduit 36, operable between a valve open position to permit hot water below the boiling point and at atmospheric pressure, but hot enough to cook food products such as pasta, to flow through said conduit from the hot water tank 34 into said cavity 4 of said cooking chamber 2 and a valve closed position to discontinue such flow.

A low pressure outlet port 40 also opens to said cavity 4, connected to a water drain 42 by a drainage conduit 44 for draining such hot water from the cavity 4.

A heating element 46 is provided for the cavity 4 of the cooking chamber 2, energized by an electrical power source 48 and controlled by electrical switch 50 connected to open and close the circuit 52 which connects the heating element 46 to the electrical power source 48. The heating element 46 pre-heats the cavity 4 of the cooking chamber 2 to raise the temperature within the cavity 4 to approximately the temperature of the highly pressurized, high temperature water in the pressurized boiler 16 prior to opening control valve 22 and flowing such water into the cavity 4. The purpose of raising the temperature within the cavity 4 before admitting the highly pressurized, high temperature water is to avoid lowering the temperature of such water as it enters the cavity 4 causing its volume to contract thus lowering its pressure to the point it begins to vaporize, to change from its liquid state to its gaseous state. The switch operator 54 to operate switch 50 between its circuit open and circuit closed positions is positioned adjacent the cooking chamber 2. The heating element 46 can also be energized to raise the temperature of the highly pressurized, high temperature water after it enters the cavity 4 of cooking chamber 2 and to maintain a constant elevated temperature of such water throughout the entire time it remains in the cavity 4 of the cooking chamber 2.

It is important that the highly pressurized, high temperature water remains in its liquid state when it enters the cavity 4 and for a pre-selected time period thereafter in order to rapidly permeate the cell structure of pasta received in the cavity 4 before it begins to soften. If the pressure within cavity 4 is allowed to drop, the water at such high temperature will begin to change into its vapor stage, or gaseous stage. At the vapor stage, or as steam, the steam tends to soften the pasta without impregnating it, without permeating into and through its cell structure sufficiently to thoroughly and rapidly cook all interior portions of the pasta. The result would be pasta that is not thoroughly cooked all the way through.

To further assist in maintaining sufficient pressure in the cavity 4 of the cooking chamber 2, a supplemental source of pressurized fluid is provided by the fluid compressor pump 56, driven by electric motor 58 to fill the pressurized storage tank 60 with pressurized fluid under pressure of about 300 psi. The pressurized fluid tank 60 is connected to conduit 18 by conduit 62 to supply more highly pressurized fluid to conduit 18 for in turn increasing the fluid pressure in the cavity 4 of the cooking chamber 2. Flow of highly pressurized fluid through conduit 62 to conduit 18 and thence into the cavity 4 of cooking chamber 2 is controlled by control valve 64. The valve operator 66 of control valve 64 is positioned adjacent the cooking chamber 2.

With the switch operator 54 and valve operator 66 positioned adjacent the cooking chamber 2, both the temperature and pressure within the cavity 4 can be controlled and maintained at the desired levels to substantially prevent vaporization of the highly pressurized, high temperature water entering the cavity 4 during the initial phase of exposing pasta in the cavity 4 thereto and during the entire time until such highly pressurized, high temperature water in its liquid state has thoroughly permeated the cell structure of the pasta to thereby cook all interior parts of the pasta thoroughly as well as rapidly.

A thermometer 68 is provided on the cooking chamber 2 to indicate the interior temperature of the cavity 4. A pressure meter 70 is also provided on the cooking chamber 2 to indicate the pressure within the interior of the cavity 4. By watching the thermometer 68 and pressure meter 70, and by operating the switch 54 which controls the heating element 46 and the valve operator 66 which controls the supply of increased air pressure from supplemental pressure tank 60, the pressure and temperature of the water entering the cavity 4 from the boiler 16 can be maintained at the pressure and temperature necessary to keep such highly pressurized, high temperature water substantially in its liquid state for the desired and pre-selected period of time.

The pressure and temperature can be varied somewhat depending on the particular pasta being cooked. For thicker pastas such as mostacholi, the pressure and temperature needed to fast cook is greater. For thinner pastas such spaghetti, the pressure and temperature needed to fast cook is less.

The equipment described above can produce and maintain pressures up to 300 psi and temperatures up to 450° Fahrenheit, and any desired level below.

The period of time that such highly pressurized, high temperature water is in the cavity 4 of cooking chamber 2 to fact cook pasta received therein can be controlled and limited to whatever period of time desired by operation of high pressure inlet control valve 22 to let such highly pressurized, high temperature water into cavity 4 and by operation of high pressure outlet control valve 30 to permit such highly pressurized, high temperature water to leave the cavity 4 and enter the expansion tank 26. The inlet control valve 22 and outlet control valve 30 are positioned adjacent to the cooking chamber 2 for convenient access to control the flow into and out of cavity 4 of the highly pressurized, high temperature water.

As an example of the water pressure, temperature and time needed to fast cook a thin pasta such as spaghetti, a water temperature of about 310° Fahrenheit under pressure of about 100 pounds per square inch (psi) wherein the water is maintained substantially in its liquid state will thoroughly fast cook such spaghetti or other comparably thin pasta within a time period of about thirty seconds.

The pressure, temperature, inlet and outlet controls can be manually operated or automatically operated by relays, or SCRs or other electronic switches and timers in an electric control circuit. The inlet cover 10 for pasta receiving opening 6 and outlet cover 12 for pasta discharge opening 8 can also be manually operated or automatically operated by servo motors controlled by timers in an electric control circuit.

The low pressure inlet control valve 38 operable to admit hot water below the boiling point into cavity 4 of the cooking chamber 2 is also positioned adjacent the cooking chamber 2 for convenient access. After the high pressure outlet control valve 30 has been opened and the highly pressurized, high temperature water discharged from the cavity 4, such control valve 30 is moved to the valve closed position. Low pressure inlet control valve 38 is then moved to the valve open position to admit a measured quantity of hot water below the boiling point into the cavity 4 to further cook the pasta therein in such hot water for a selected period of time.

The temperature of such hot water is preferably about 190° Fahrenheit, and the selected period of time for this second cooking phase is preferably about twenty seconds.

After the time period selected for this second cooking phase, a drain valve 72 connected in drainage conduit 44 is moved to its valve open position and the below the boiling point hot water is drained from the cavity 4.

When the below the boiling point water is admitted to the cavity 4, the switch 50 controlling the heating element 46 is simultaneously switched to the circuit open position to de-energize the heating element 46 to allow the cooking chamber 2 to cool and the temperature within the cavity 4 to drop towards the temperature of the below the boiling point water being admitted. When the drain valve 72 opens the drainage conduit 44 to drain the below the boiling point water from the cavity 4, the heating element 46 is also de-energized to allow the cooking chamber 2 and cavity 4 to cool further. The drain valve 72 can also be operated manually or automatically by use of a solenoid valve controlled by a timer in an electrical circuit.

As soon as the below the boiling point water has been drained from the cavity 4, the outlet cover 12 is opened to allow the cooked pasta to drop out of the cavity 4 and on to a serving plate 74 on the base plate 76 below the pasta discharge opening 8.

A sauce dispenser 78, comprising a sauce container 80, a sauce discharge spout 82, and a sauce dispensing pump 84, is positioned on the base plate 76 adjacent the serving plate 74. The sauce discharge spout 80 is pivotally mounted to pivot between a position which is in registration with the serving plate and a position which is out of registration therewith. After the cooked pasta has been dropped on to the serving plate 74, the sauce discharge spout 82 is pivoted to its "in-registration" position for depositing sauce on the pasta, and the sauce dispensing pump 84 is operated to dispense the sauce on the pasta.

The pivotable sauce discharge spout 82 and sauce dispensing pump 84 may be operated manually, or automatically by a relay and servo-motor controlled by a timer in an electrical control circuit.

A fine mesh screen 86 is provided over the high pressure outlet port 24 to prevent any of the pasta in the cavity 4 from being sucked into and through the discharge conduit 28 when high pressure outlet control valve 30 is opened to let the highly pressurized, high temperature water escape into the expansion tank 26.

The fast cook pasta machine in accordance with this invention may have the cooking chamber 2 positioned at a remote location away from the pressurized boiler 16 and hot water tank 34, far enough so the heat radiating from the exterior of the boiler 16 and hot water tank 34 has dissipated before it can reach the cooking chamber 2. This is desirable for use of the cooking chamber 2 in locations where heat from the boiler 16 and hot water tank 34 will make the room uncomfortably hot, such as the close quarters working areas of fast food restaurants, the usually small rooms in which food vending machines are often installed, the kitchen or snack room of a home, and the like.

The boiler 16 and hot water tank 34 may also be mounted adjacent the cooking chamber 2 in a single compact cabinet 88. In such case, the boiler 16 and hot water tank 34 are provided with an outer wall 90 of heat insulating material to lessen the heat that would otherwise radiate from the boiler 16 and hot water tank 34.

For use in commercial installations such as fast food restaurants in which more than one cooking chamber 2 may be needed to provide rapid service to a large number of customers, a single large boiler 16 and a single large hot water tank 34 may be provided at a remote location to which a plurality of cooking chambers 2 are connected.

Construction and operation of a pressurized boiler 16 is conventional, and need not be described in great detail. Rotary pump 92 is connected by conduit 93 to pump water under pressure into the pressurized boiler 16 to create a pressure therein of from one hundred pounds per square inch (psi) up to about three hundred psi. Pump 92 driven by motor 95 is connected to the water lines from a community water supply.

A heating element 94 in the pressurized boiler 16 is connected to the electric line of a public utility or other electric power source, to heat the water in the boiler to an elevated temperature of three hundred degrees Fahrenheit up to about four hundred degrees Fahrenheit.

An electrical control circuit 96 to operate the fast cook pasta machine in accordance with this invention automatically, includes a series of relays and timers to open and close solenoid valves which may be substituted for manually operated valves to control flow of water into and out of the cooking chamber 2, and to open and close the electrical circuits which energize the heating elements and electric motors.

The electric control circuit 96 includes a first relay 98 in an inlet cover control circuit 100 to operate a solenoid valve which admits hydraulic fluid from hydraulic system 102 to hydraulic cylinder 104 when in one position to retract the plunger 106 which pivots the operating lever 108 of inlet cover 10 to move the inlet cover 10 to the cover open position for admitting a pre-measured individual serving of pasta into the cooking chamber 2.

A first timer 110 is provided in the inlet cover control circuit 100 to automatically energize the inlet cover control circuit and open the inlet cover 10 at the start of a new cycle when the machine is set to operate in continuous cycles. After a timed period to allow the next serving of pasta into the cooking chamber 2, the timer 110 de-energizes the control circuit whereupon the relay 98 returns to its normally biased contact position which causes the solenoid valve to move to its second position which admits hydraulic fluid to the cylinder 104 through the line which extends the plunger 106 pivoting operating lever 108 of inlet cover 10 in the direction which closes the pasta receiving opening 6.

The pasta receiving and discharge openings 6 and 8, and their respective inlet and outlet covers 10 and 12 have a frusto conical configuration which provides a more effective seal of the cavity 4 when in the closed position. The leverage mechanism including the operating levers 108 provide a mechanical advantage to hold both covers tightly closed, and the hydraulic cylinders which operate the lever mechanism provides exceptionally strong force to hold the covers 10 and 12 in the closed position to prevent escape of any of the pressurized water from the cavity 2 at operating pressures therein in excess of 300 psi. A layer of resilient sealing material 112 is provided around the seating face of the inlet cover 10 and outlet cover 12 to provide an even more effective seal.

A second relay 114 is provided in a high pressure inlet port control circuit 116 to operate a solenoid valve which opens inlet control valve 22 in one position when circuit 116 is energized and closes such valve in the second position when circuit 116 is de-energized causing relay 114 to return to its normally biased contact position. A second timer 118 is connected in control circuit 116, timed to open the inlet control valve 22 after the inlet cover 10 has been moved to the cover closed position and to keep it open until the high pressure outlet port 24 is opened by movement of outlet control valve 30 to its open position. At such time, the timer 118 de-energizes control circuit 116 causing inlet control valve 22 to move to its valve closed position.

A third relay 120 is provided in a high pressure outlet port control circuit 122 to operate a solenoid valve which opens outlet control valve 30 in one position when circuit 122 is energized and closes such valve in the second position when circuit 122 is de-energized causing relay 120 to return to its normally biased contact position. A third timer 124 is connected in control circuit 122, timed to open the outlet control valve 30 after a pre-selected time period such as thirty seconds for completion of the first phase of the fast cook cycle, and to keep valve 30 open for the short pre-selected time span needed for the high pressure water in cavity 4 of the cooking chamber 2 to escape. After such pre-selected time delay, timer 124 de-energizes this control circuit 122 causing outlet control valve 30 to close.

A fourth relay 126 is provided in a supplemental heating control circuit 128 to open and close the electrical circuit 52 which energizes the supplemental heating element 46 in the cooking chamber 2 to maintain the precise pre-determined water temperature therein during the first phase of the fast cook cycle. A thermostat 130 is connected in control circuit 128 to energize it and operate relay 126 to energize the heating element 46 if and when the water temperature within cavity 4 drops below the precise pre-determined temperature chosen.

A fifth relay 132 is provided in a supplemental pressure control circuit 134 to open and close the electrical circuit which powers electric motor 58 to operate air compression pump 56 for storage in pressurized tank 60 to maintain the precise pre-determined pressure needed within the cooking chamber 2 to substantially prevent vaporization of the high temperature water therein during the first phase of the fast cook cycle. A pressure sensitive control switch 136 is connected in control circuit 134 to energize such circuit and operate air compression pump 56 to deliver increased pressure to cooking chamber 2 if and when pressure within its cavity 4 drops below the precise pre-determined pressure needed.

A sixth relay 138 is provided in a low pressure hot water inlet port control circuit 140 to operate a solenoid valve which opens low pressure inlet control valve 38 in one position when control circuit 140 is energized and closes such valve in the second position when circuit 140 is de-energized causing relay 138 to return to its normally biased contact position. A timer 142 is connected in control circuit 140, timed to open the low pressure hot water inlet control valve 38 after the high pressure outlet control valve 30 has been closed. The timer 142 is set to keep the low pressure hot water control valve 38 open until the pre-determined measured amount of heated, but below the boiling point, water has been admitted to the cooking chamber 2 to complete the second phase of the fast cook cycle.

A seventh relay 144 is provided in a low pressure hot water outlet port control circuit 146 to operate a solenoid valve connected to open and close the drain valve 72. A timer 148 is connected in control circuit 146 set to open the drain valve 72 after the pre-selected time period chosen for the second phase of the fast cook cycle, such as twenty seconds. At such time, the timer 148 energizes control circuit 146 causing relay 144 to move the solenoid valve to its position which opens the drain valve 72. The timer 148 is set to de-energize control circuit 146 after the time lapse determined to be needed for the hot water to fully drain from the cavity 4 of the cooking chamber 2, at which time relay 144 returns to its normally biased contact position thereby causing solenoid valve to move to its second position which closes the drain valve 72.

An eighth relay 150 is provided in an outlet cover control circuit 152 to operate a solenoid valve which admits hydraulic fluid from hydraulic system 102 to hydraulic cylinder 154 when in one position to retract the plunger 156 which pivots the operating lever 108 of outlet cover 12 to the cover open position for permitting the cooked pasta to drop out of the cavity 4 of cooking chamber 2 on to a serving plate 74.

A timer 158 is provided in the outlet cover control circuit 152 to energize the outlet cover control circuit and open the outlet cover 12 as soon as the water has been drained from the cooking chamber 2 and the drain valve 72 has been closed. After the timed period necessary for the cooked pasta to be discharged from the cooking chamber 2, the timer 158 de-energizes the control circuit 152 whereupon relay 150 returns to its normally biased contact position which causes the solenoid valve to move to its second position which admits hydraulic fluid to the cylinder 154 through the line which extends the plunger 156 thereby pivoting the operating lever 108 in the direction which closes the pasta discharge opening 8.

A ninth relay 160 is provided in a sauce dispenser pivoting control circuit 162 to operate a solenoid valve connected to pivot sauce dispenser 78 and its spout 82 between a first position out of registration with serving plate 74 and a second position which places spout 82 in registration with serving plate 74 to dispense sauce on the pasta therein. A timer 164 is connected in control circuit 162 timed to pivot sauce dispenser 78 and its spout 82 from the first out of registration position to the second in registration position after the cooked pasta has been deposited on to the serving plate 74. It does so by energizing control circuit 162 which causes relay 160 to move the solenoid valve to the position which pivots sauce dispenser 78 and its spout 82 into registration with serving plate 74. The timer 164 is timed to de-energize control circuit 162 which causes relay 160 and the solenoid valve to pivot sauce dispenser 78 and its spout 82 back out of registration with plate 74 after the timed period needed for a measured quantity of sauce to be dispensed on to the cooked pasta in serving plate 74.

A tenth relay 166 is provided in a sauce dispensing control circuit 168 to open and close the electric circuit which powers small electric motor 170 to operate the small rotary dispensing pump 84 which pumps sauce from dispenser 78 through the spout 82 on to the pasta in serving plate 74. A timer 172 is connected in control circuit 168 to energize control circuit 168 for whatever length of time desired for pump 84 to discharge sauce on to the pasta in serving plate 74.

Operation of the fast cook pasta machine in accordance with this invention as follows.

A measured quantity of pasta sufficient for one serving is positioned over the pasta receiving opening 6 of the cooking chamber 2, the inlet cover 10 is opened to allow the measured quantity of pasta to drop into the cavity 4. The outlet cover 12 at this time is closed. The inlet cover 10 is then closed also to seal the cavity 4 at both ends. Hydraulic cylinder 104 which opens and closes inlet cover 10 is controlled either by manual valve operator 174 or by relay 98 in the inlet cover control circuit 100.

High pressure inlet control valve 22 is then opened, manually or by the timer in an electric control circuit to fill the cavity 4 with highly pressurized, high temperature water from the boiler 16 at the pre-selected temperature and under the pre-selected pressure. The thermometer 68 and pressure meter 70 on the cooking chamber 2 indicate if any additional heat must be supplied by the heating element 46 and any additional pressure from the supplemental pressurized tank 60 to maintain the precise high pressure and high temperature needed within the cavity 4 to maintain the highly pressurized, high temperature water substantially in its liquid state for the predetermined fast cook time period of about thirty seconds to thoroughly penetrate the cell structure of the pasta before it softens and thereby tends to prevent further penetration of the hot water into the interior portions of the pasta material.

It is important during this first phase of the fast cook cycle that the high temperature water in the cavity 4 be kept under sufficiently high pressure to substantially prevent vaporization thereof. Water in its vapor phase, or as steam, will heat the food material it contacts very rapidly causing it to soften and close the pores of its molecular cell structure but the vapor or gas molecules do not themselves penetrate thoroughly into and through the pores of the cell structure before they soften and close. The result is that the interior portions of the pasta are not cooked when the highly pressurized, high temperature water is allowed to vaporize and turn to steam within the cavity 4.

The switch operator 54 to control the heating element 46 and the valve operator 66 to control the supplemental source of air pressure from pressurized tank 60, enable precise control, adjustment and maintenance of both pressure and temperature within the cavity 4 during and throughout this critical first phase of the fast cook cycle.

At the end of the pre-selected time period for the first phase of the fast cook cycle, such as thirty seconds, the high pressure inlet control valve 22 is closed, manually or by the timer in an electric control circuit, and the high pressure outlet control valve 30 is opened, manually or by the timer in an electric control circuit, to allow the highly pressurized, high temperature water to escape from the cavity 4 of the cooking chamber 2 into the expansion tank 26. From there, the vapor and water can be discharged into an outlet drain or pumped through a filter and back to the boiler 16 for re-use.

The high pressure outlet control valve 30 is then closed, manually or by the timer in an electric control circuit. The pasta remains in the cavity 4 of the single cooking chamber 2 utilized by this invention after completion of the first phase of the fast cook cycle. The low pressure inlet control valve 38 next opens, manually or by the timer in an electric control circuit, to admit a measured quantity of below the boiling point, but cooking temperature, hot water into the cavity 4 of the cooking chamber 2.

The measured quantity of such below the boiling point but still cooking temperature water is enough to fully cover the pasta in the cavity 4 of the cooking chamber 2. When such measured quantity of hot water has been admitted into the cavity 4, the inlet control valve 38 is closed, manually or by the timer in an electric control circuit. The switch operator 54 controlling the heating element 46 of the cooking chamber 2 is moved to its switch open position to de-energize heating element 46. The valve operator 66 controlling the supplemental pressurized air source should be moved to the valve closed position at the time the high pressure inlet control valve 22 is closed.

The operation of switch operator 54 and valve operator 66 may be controlled and done manually or by the timer in an electric control circuit.

The pasta in cavity 4 of the cooking chamber 2 is allowed to cook during the second phase of the fast cook cycle for a pre-selected time period such as twenty seconds. At the end of this period, the drain valve 72 is opened, manually or by the timer in an electric control circuit, and the below the boiling point but still hot water is drained out of the cavity 4. From there such water can be discharged into an outlet drain or pumped through a filter and back to the hot water tank 34 for re-use.

If necessary to maintain the desired cooking temperature of the water during the second phase, the heating element 46 may be energized. However, maintaining the exact elevated cooking temperature of the water during the second phase of the fast cook cycle is not as critical as during the first phase, and the hot water at cooking temperature when it enters the cooking chamber 2 does not usually drop in temperature enough during the short time span of about twenty seconds to require use of the supplemental heating element 46 during the second phase of the fast cook cycle.

As soon as the hot water has been drained from the cavity 4, the outlet cover 12 of the cooking chamber 2 is opened, manually or by the timer of an electric control circuit, and the fast cooked pasta is dropped on to the serving plate 74. The sauce dispenser 78 is then operated by pivoting sauce discharge spout 82 into registration with the serving plate and operating the dispensing pump 84 to dispense sauce on to the pasta in the serving plate 74, either manually or by the timer in an electric control circuit. Hydraulic cylinder 154 which opens and closes outlet cover 12 is controlled either by manual valve operator 176 or by relay 150 in the outlet cover control circuit 152.

The drain valve 72 is then closed, manually or by the timer in an electric control circuit, and the cooking chamber 2 is then ready to receive another measured quantity of pasta to fast cook a second helping of pasta.

The combined time span for both the first and second phases of the cooking cycle is about fifty seconds to cook an individual serving of pasta and deposit on a serving plate ready to eat.

Since the pasta remains in place in the single cooking chamber in accordance with this invention throughout both phases of the cooking cycle, and the partially cooked pasta does not have to be transported from one cooking chamber to another, through conduits, nor through valves which open and close, there is only one major part to clean as far as food particles are concerned for purposes of maintaining sanitary food conditions. That is the cooking chamber 2. Also, the cooking chamber 2 opens completely at both ends for easy access, both for inspection and cleaning.

Precise control of water temperatures and pressures within the cavity 4 of the cooking chamber 2 can also be more easily monitored and maintained when there is only a single cooking chamber in which both phases of the fast cook cycle are performed.

By utilizing a single cooking chamber for both phases of the fast cook cycle, the substantial expenses of a second cooking chamber, plus a conduit between a first and second chamber, plus a valve suitable for passing a food product through to a second cooking chamber, with the associated seals and connectors such additional items require, are all avoided.

Space requirements are also less for a single cooking chamber fast cook machine in accordance with the present invention. For such commercial applications as fast food restaurants in which several machines may be needed, the space requirement factor may be the most important of all.

An automatic pasta conveyor system may be positioned for use with the fast cook pasta machine in accordance with this invention to automatically deliver a measured quantity of pasta to be cooked for dropping into the cooking chamber 2 through the pasta receiving inlet aperture 6 when inlet cover 10 has been opened. Many assembly line types of conveyors which can perform this function are well known to the prior art, and there is no need to limit this invention to use with any one kind of automatic conveyor system. It is also possible with this particular fast cook pasta machine to manually insert a pre-measured quantity of pasta into the cooking chamber 2 through the inlet aperture 6 because of the use of a pivotable cover 10 which provides direct access to the cavity 4 of the cooking chamber 2 when the inlet cover 10 is pivoted to its open position. This is not as easily done when the entrance to the cavity of the cooking chamber is controlled by a ball valve or other type of closure device since workers cannot as readily see when the entrance is open as when a pivotable cover is used. Manual feeding of pre-measured quantities of pasta into the cooking chamber 2 may be preferable to an automatic or feeding system for many applications, particularly since the fast cook machine in accordance with this invention can be used to cook a wide variety of pastas and other similar foods having different shapes and sizes. It becomes virtually impossible to adapt an automatic conveyor and delivery system for use in a way that permits change whenever desired from cooking one type of pasta or food product to a different type having a different shape and size.

We claim:

1. A fast cook machine to fast cook pasta and similar food products, comprising a cooking chamber to receive said pasta or similar food products for cooking therein, first stage cooking means to provide a first stage of cooking for said cooking chamber, second stage cooking means to provide a second stage of cooking for said cooking chamber, first stage connecting means to connect said first stage cooking means to said cooking chamber and second stage connecting means to connect said second stage cooking means to said same cooking chamber, food inlet means to permit entry of said pasta or similar food products into said cooking chamber for cooking and food outlet means to permit exit of said pasta or similar food products from said cooking chamber after completion of both said first and second stages of cooking within said same cooking chamber.

2. A fast cook machine to fast cook pasta and similar food products, comprising a cooking chamber to receive said pasta or similar food products for cooking therein, pressurized cooking means to provide and flow high temperature water into said cooking chamber at a temperature above that of the boiling point of water when at atmospheric pressure and under an elevated pressure which substantially prevents said high temperature water from vaporizing while in said cooking chamber for a predetermined amount of time to cook said pasta or similar food products therein, verification means connected to verify that the pressure needed to substantially prevent said high temperature water from vaporizing within said cooking chamber is maintained throughout said predetermined amount of time, food inlet means to permit entry of pasta or similar food products into said cooking chamber for cooking, food outlet means to remove said pasta or similar food products from said cooking chamber after completion of cooking therein, and discharge means to remove said high temperature water from said cooking chamber prior to removal of said pasta or similar food products therefrom.

3. A fast cook machine to fast cook pasta and similar food products, comprising a chamber to receive said pasta or similar food products for cooking therein, pressurized cooking means to provide high temperature water at a temperature above that of the boiling point of water when at atmospheric pressure and under an elevated pressure which substantially prevents said high temperature water from vaporizing, said cooking chamber and said pressurized cooking means being located remote from each other, and connecting means to operatively connect said pressurized cooking means to said cooking chamber for delivering thereto said high temperature water under an elevated pressure which substantially prevents said high temperature water from vaporizing, food inlet means to permit entry of said pasta or similar food products into said cooking chamber for cooking and food outlet means to discharge said pasta or similar food products from said cooking chamber after completion of cooking therein.

4. A fast cook machine to fast cook pasta and similar food products as set forth in claim 1, wherein said first stage cooking means includes a pressurized boiler to heat water to a temperature above the boiling point of water at atmospheric pressure and to also elevate the pressure thereon to a level which substantially prevents said heated water from vaporizing while in said pressurized boiler, said first stage connecting means includes a first stage conduit to flow said heated water under said elevated pressure from said pressurized boiler to said cooking chamber to provide said first stage of cooking, discharge means to remove said heated water of said first stage cooking means from said cooking chamber prior to said second stage of cooking, and food retaining means to prevent removal of said pasta or similar food products from said cooking chamber while said heated water under said elevated pressure is being removed therefrom.

5. A fast cook machine to fast cook pasta and similar food products as set forth in claim 4, wherein said second stage cooking means includes a hot water tank having hot water therein heated to a cooking temperature below the boiling point of water at atmospheric pressure, said second stage connecting means includes a second stage conduit to flow said hot water from said hot water tank to said cooking chamber after said heated water under said elevated pressure of said first stage cooking means has been removed therefrom.

6. A fast cook machine to fast cook pasta and similar food products as set forth in claim 5, including drain means to drain said hot water of said second stage cooking means from said cooking chamber prior to removal of said pasta or similar food products therefrom.

7. A fast cook machine to fast cook pasta and similar food products as set forth in claim 4, wherein said first stage cooking means includes supplementary pressure increasing means apart from said pressurized boiler to supply any additional pressure needed to said cooking chamber to maintain the pressure therein during said first stage of cooking at a level which substantially prevents said heated water therein from vaporizing.

8. A fast cook machine to fast cook pasta and similar food products as set forth in claim 4, wherein said first stage cooking means includes supplementary temperature increasing means apart from said pressurized boiler to supply any increase in temperature needed to said cooking chamber to maintain the water temperature therein throughout said entire first stage of cooking at the same elevated temperature level as when said heated water left said pressurized boiler and before flowing through said first stage conduit to said cooking chamber.

9. A fast cook machine to fast cook pasta and similar food products as set forth in claim 4, wherein said first stage cooking means includes pressure and temperature control means to maintain constant pressure and water temperature in said cooking chamber throughout said entire first stage of cooking whereby said pressure and water temperature in said cooking chamber is substantially the same at the end of said first stage of cooking as it was at the beginning thereof.

10. A fast cook machine to fast cook pasta and similar food products as set forth in claim 5, including a compact housing, said cooking chamber, said pressurized boiler, said first stage conduit connecting said pressurized boiler to said cooking chamber, said hot water tank, and said second stage conduit connecting said hot water tank to said cooking chamber are mounted in said compact housing.

11. A fast cook machine to fast cook pasta and similar food products, comprising first stage cooking means to provide a first stage of cooking, second stage cooking means to provide a second stage of cooking, said first stage cooking means including a pressurized boiler to heat water to a temperature above the boiling point of water at atmospheric pressure and to also elevate the pressure thereon to a level which substantially prevents said heated water from vaporizing while in said pressurized boiler, said second stage cooking means includes a hot water tank having hot water therein heated to a cooking temperature below the boiling point of water at atmospheric pressure, a plurality of cooking chambers to receive said pasta or similar food products therein for cooking, including a first cooking chamber to receive said pasta or similar food products therein for cooking, a second cooking chamber to receive said pasta or similar food products therein for cooking, first connecting means to connect said pressurized boiler of said first stage cooking means and said hot water tank of said second stage cooking means to said first cooking chamber for completion of said first and second stages of cooking in said first cooking chamber and second connecting means to connect said pressurized boiler of said first stage cooking means and said hot water tank of said second stage cooking means to said second cooking chamber for completion of said first and second stages of cooking in said second cooking chamber.

12. A fast cook machine to fast cook pasta and similar food products as set forth in claim 11, wherein said pressurized boiler of said first stage cooking means and said hot water tank of said second stage cooking means are positioned remote from said plurality of cooking chambers at a sufficient distance whereby elevated heat radiating from the exterior of said pressurized boiler and of said hot water tank is thereby substantially prevented from reaching said plurality of cooking chambers.

13. A fast cook machine to fast cook pasta and similar food products as set forth in claim 4, wherein said discharge means to remove said heated water of said first stage cooking means from said cooking chamber prior to said second stage of cooking includes an expansion tank and a discharge conduit leading from said cooking chamber to said expansion tank.

14. A fast cook machine to fast cook pasta and similar food products as set forth in claim 13, wherein said cooking chamber includes a discharge aperture opening to said discharge conduit, said food retaining means to prevent removal of said pasta or similar food products from said cooking chamber while said heated water under said elevated pressure is being removed therefrom includes a fine mesh screen positioned over said discharge aperture of said cooking chamber.

15. A fast cook machine to fast cook pasta and similar food products as set forth in claim 4, including sauce dispensing means to dispense sauce on said pasta after it has been cooked and removed from said cooking chamber.

16. A fast cook machine to fast cook pasta and similar food products as set forth in claim 1, wherein said food inlet means comprises an inlet cover mounted for movement between a cooking chamber open position and a cooking chamber closed position, said food outlet means comprises an outlet cover mounted for movement between a cooking chamber open position and a cooking chamber closed position.

17. A fast cook machine to fast cook pasta and similar food products as set forth in claim 16, wherein said food inlet means comprises an inlet aperture opening to said cooking chamber, said inlet aperture being bounded by a frusto-conical peripheral wall, said inlet cover having a corresponding frusto-conical peripheral wall to seat in facing relationship to said frusto-conical peripheral wall bounding said inlet aperture when said inlet cover is moved to said cooking chamber closed position.

18. A fast cook machine to fast cook pasta and similar food products as set forth in claim 16, wherein said food outlet means comprises an outlet aperture opening to said cooking chamber, said outlet aperture being bounded by a frusto-conical peripheral wall, said outlet cover having a corresponding frusto-conical peripheral wall to seat in facing relationship to said frusto-conical peripheral wall bounding said outlet aperture when said outlet cover is moved to said cooking chamber closed position.

19. A fast cook machine to fast cook pasta and similar food products as set forth in claim 16, including inlet cover manipulation means to move said inlet cover between said cooking chamber open and said cooking chamber closed positions, said inlet cover manipulation means including fluid pressure operating means to move said inlet cover between said positions and to hold said inlet cover in said cooking chamber closed position under pressure of said fluid pressure operating means.

20. A fast cook pasta machine to fast cook pasta and similar food products as set forth in claim 16, including outlet cover manipulation means to move said outlet cover between said cooking chamber open and said cooking chamber closed positions, said outlet cover manipulation means including fluid pressure operating means to move said outlet cover between said positions and to hold said outlet cover in said cooking chamber closed position under pressure of said fluid pressure operating means.

21. A fast cook pasta machine to fast cook pasta and similar food products as set forth in claim 19, wherein said fluid pressure operating means to move said inlet cover between said cooking chamber open and closed positions comprises a pressurized hydraulic system including a hydraulic cylinder having a plunger movable between an extended and a retracted position.

22. A fast cook pasta machine to fast cook pasta and similar food products as set forth in claim 20, wherein said fluid pressure operating means to move said outlet cover between said cooking chamber open and closed positions comprises a pressurized hydraulic system including a hydraulic cylinder having a plunger movable between an extended and a retracted position.

* * * * *